United States Patent [19]
Sherman

[11] 3,738,012
[45] June 12, 1973

[54] GAUGE FOR MEASURING ANGLES
[76] Inventor: Alden O. Sherman, 85 Weston Road, Weston, Conn. 06880
[22] Filed: Jan. 26, 1971
[21] Appl. No.: 109,797

[52] U.S. Cl. ............ 33/172 B, 33/174 E, 33/174 Q
[51] Int. Cl. .............................................. G01b 5/24
[58] Field of Search ..................... 33/172 B, 174 E, 33/174 Q

[56] References Cited
UNITED STATES PATENTS
| | | | |
|---|---|---|---|
| 2,512,863 | 6/1950 | Kapuczin | 33/174 E |
| 1,153,695 | 9/1915 | Kohn | 33/172 B X |
| 1,463,580 | 7/1923 | Harter | 33/172 B UX |
| 2,713,209 | 7/1955 | Brown | 33/172 B |

FOREIGN PATENTS OR APPLICATIONS
| | | | |
|---|---|---|---|
| 945,070 | 12/1963 | Great Britain | 33/174 TA |
| 921,358 | 12/1954 | Germany | 33/174 E |

Primary Examiner—Robert B. Hull
Attorney—Smythe & Moore

[57] ABSTRACT

An attachment is mounted on the support of a dial indicator having a reciprocable actuating stem, and a measuring blade is pivotably mounted on a shaft in the attachment. An actuating arm is mounted on the shaft and has an inwardly curved portion which contacts the stem of the dial indicator so as to actuate the dial indicator in a linear response with respect to the angle indicated by the measuring blade.

3 Claims, 8 Drawing Figures

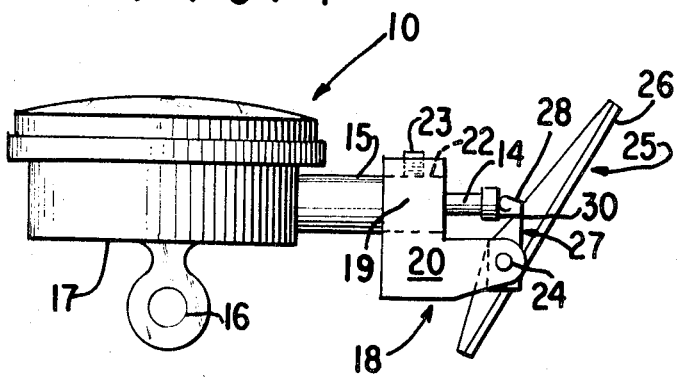
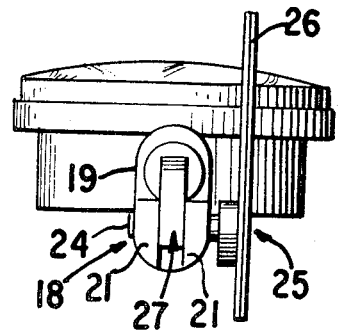
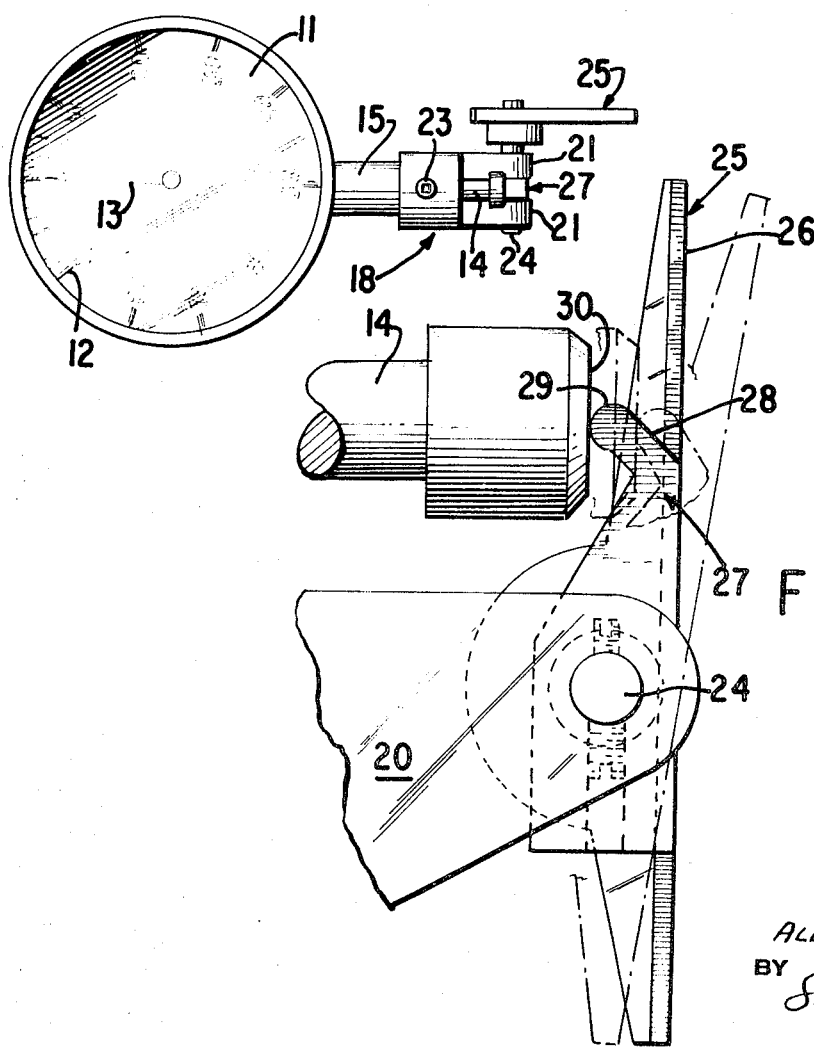

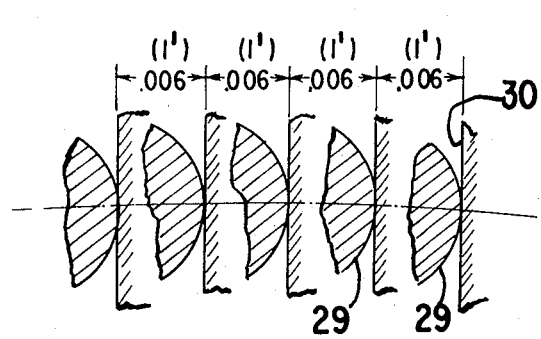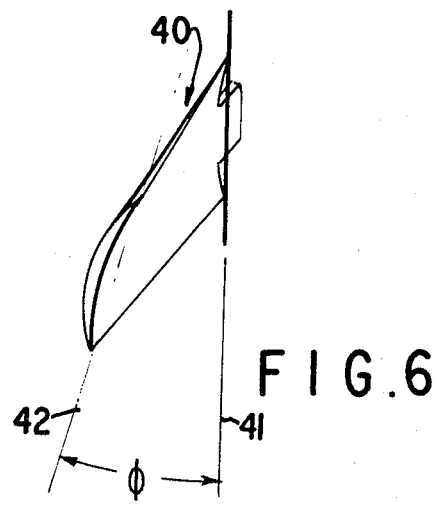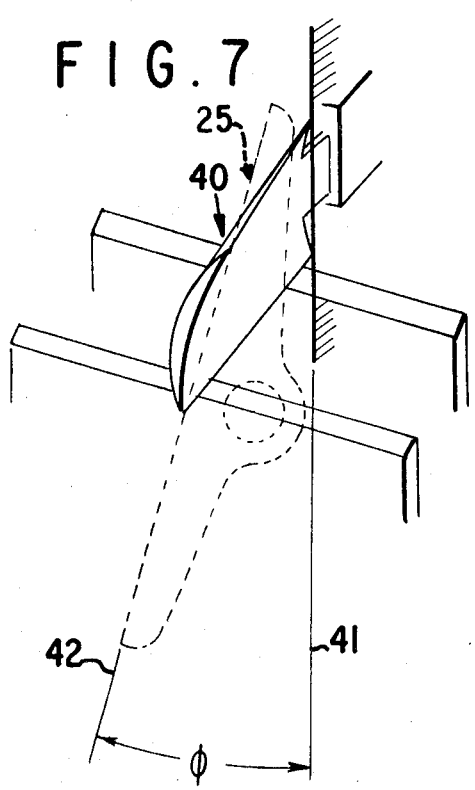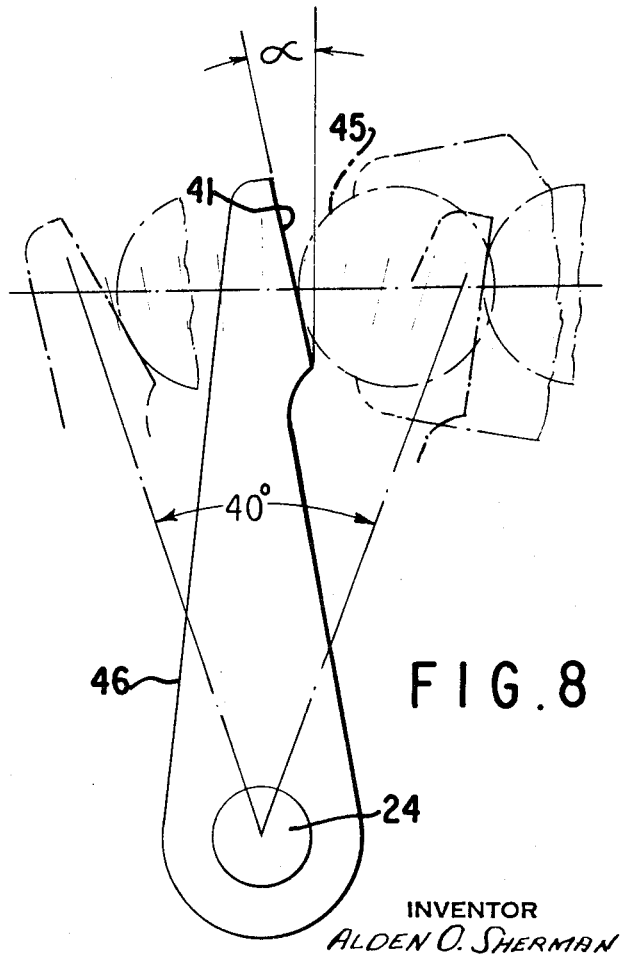

GAUGE FOR MEASURING ANGLES

This invention relates to a gauge for measuring angles.

In many manufacturing operations, it is necessary to check the angular relationship of one part with respect to another part. In one such operation, for example, the angular relationship of the inner portion of a gas turbine blade is checked against the angular relationship of the outer portion of the blade. Intermediate portions of the blade must have a definite angular relationship. While measuring instruments have been devised for the measurement of angles, such instruments are quite complicated and very specialized in that they are constructed for the measurement of angles under particular circumstances.

One of the objects of the present invention is to provide an arrangement for an accurate measurement of angles which can be applied to a standard dial indicator.

Another object of the present invention is to provide an attachment which actuates a standard dial indicator in linear relationship to the measurement angle.

According to one aspect of the present invention, an angle measuring attachment for a dial indicator having a reciprocable actuating stem comprises a mounting bracket having a bifurcated extension substantially parallel to the actuating stem of the dial indicator and spaced therefrom. A shaft is pivotably mounted in the bifurcated extension, and a measuring blade is mounted on the shaft outwardly of the extension. An actuating arm is mounted on the shaft between the bifurcations. Means are provided on the actuating arm for actuating the actuating stem linearly in response to a pivoting movement of the measuring blade when measuring an angle.

Other objects, advantages and features of the present invention will become apparent on the accompanying description drawings, which are merely exemplary.

In the drawings:

FIG. 1 is a side elevational view of the attachment according to the present invention mounted upon a standard dial indicator;

FIG. 2 is an end elevational view of the indicator and attachment of FIG. 1 looking toward the measuring blade;

FIG. 3 is a top plan view of the indicator and attachment of FIG. 1;

FIG. 4 is a side elevational view in enlarged scale of the actuating arm carried by the attachment and showing this arm engageable with the reciprocable actuating stem of the dial indicator;

FIG. 5 is a schematic showing of the contact of the arm with the indicator operator;

FIG. 6 is a perspective view of a gas turbine blade showing the angular relationship between the ends of a blade of one type;

FIG. 7 is a perspective view showing the blade of FIG. 6 positioned upon reference blocks with the measuring blade of the angle measuring attachment being indicated in dashed lines; and FIG. 8 is a side elevational view in enlarged scale of a modified actuating arm used when the actuating stem of the dial indicator has a ball mounted in the end thereof.

Proceeding next to the drawings wherein like reference symbols indicate the same parts throughout the various views, a specific embodiment of the present invention will be described in detail.

In FIG. 1, there is indicated generally at 10 a standard dial indicator whose face 11 (FIG. 3) is provided with a graduated scale 12 divided into divisions of 0.0001 each. The geometry of the mechanism which is to be presently described is such that one such division equals exactly one minute of an angle. The indicator may also be provided with a scale having 0.001 graduations in which case each division or 0.001 equals 10 minutes. The angular range is approximately two degrees using a 0.0001 indicator or 20° using a 0.001 indicator.

The indicator 10 is provided with a pointer 13 which by means of a mechanism well known in the art is actuated in response to the linear movement of a reciprocable actuating stem 14. The stem 14 is slidably mounted on support 15 of the indicator. The indicator may be provided with a mount 16 attached to the rear face of casing 17.

The attachment according to the present invention is indicated generally at 18 and comprises a mounting bracket 19 having a bifurcated extension 20 whose bifurcations 21 can be seen in FIGS. 2 and 3. Extension 20 is parallel to the actuating stem 14 and spaced therefrom as may be seen in FIG. 1.

The mounting bracket 19 is provided with a bore 22 for receiving the end of the support 15. The bracket can be quickly secured in position on the support by means of a set screw 23.

A shaft 24 is pivotably mounted between the bifurcations 21 and has a measuring blade 25 fixedly attached thereto outwardly of extension 20. Measuring blade 25 may be provided with a knife edge 26 so as to obtain accurate position of the blade 25 against a part whose angular relationship is to be measured.

Actuating arm 27 is also fixedly mounted on shaft 24 between the bifurcations 21. The arm 27 is provided with an upper end portion 28 which is inwardly curved as may be seen in greater detail in FIG. 4 and is provided with a rounded end 29 for engagement with a contact surface 30 mounted on the end of the actuating stem 14. The end 29 is so rounded and the curved portion 28 so positioned that the actuating stem 14 will be moved linearly in response to an angular positioning of the measuring blade 25 when measuring an angle.

Both the measuring blade 25 and the actuating arm 27 may be secured upon the shaft 24 by set screws as shown in FIG. 4.

It is to be pointed out that in this embodiment of the invention, shaft 24, which supports the measuring blade, is positioned in a plane which is parallel to the face 11 of the indicator gauge. Assembly 18 can be rotated about 15 so that the blade 25 can be angled to other than 90° relative to the face 11 of the indicator.

While the angle measuring attachment according to the present invention is susceptible of a wide range of uses, it is particularly adapted for comparing the angular relationship of both ends of a gas turbine blade or other similar object, such as blade 40 (FIG. 6). The ends of the gas turbine blade are indicated by the lines 41 and 42 with the angle between them being indicated as $\phi$. By moving the measuring blade 25 along the edges of the gas turbine blade 40 in a position substantially as shown in FIG. 7, the angular twist of one end of the blade can be compared with its other end when the inner end 41 is held against a vertical surface.

The contact surface 30 of the actuating stem 14 may be provided with a ball 45 which is embedded in its end (FIG. 8). In order to maintain the linear relationship between the pivotal movement of the measuring blade and the movement of the actuating stem, the actuating arm is shaped as shown in 46 in FIG. 8. The upper end of the arm 46 is provided with a substantially flat surface 47 which contacts the ball 45. With this relationship at an angle $\alpha$ to the radial axis of the arm, it is possible to obtain accurate measurement through an angular movement of the actuating arm of about 40°.

Thus, it can be seen that the present invention has disclosed an angle measuring attachment which can be used with a standard dial indicator. The attachment comprises a pivotably mounted blade whose angular movement is accurately transmitted into linear movement of the actuating stem of the dial indicator.

It will be understood that various details of construction and arrangement of parts may be made without departing from the spirit of the invention except as defined in the appended claims.

What is claimed is:

1. In an angle measuring attachment for a dial indicator having a reciprocable actuating stem, the combination including a mounting bracket rotatably adjustable relative to the indicator about the axis of said stem and having a bifurcated extension substantially parallel to said stem and spaced therefrom, a shaft pivotally mounted in said bifurcated extension, a measuring blade secured on said shaft by set screw means outwardly of said extension, an actuating arm secured by set screw means on said shaft between said bifurcations, and means on said actuating arm for actuating said stem linearly in response to a pivotal movement of said measuring blade when measuring an angle.

2. In an angle measuring attachment as claimed in claim 1, said linearly actuating means comprising an inwardly curved portion having a rounded end on the outer end of said actuating arm to contact the end of said actuating stem so that said arm and said actuating stem are movable in response to the angular position of said measuring blade.

3. In an angle measuring attachment as claimed in claim 1, said mounting bracket being detachable.

* * * * *